(12) United States Patent
Trubiano

(10) Patent No.: US 6,443,466 B2
(45) Date of Patent: Sep. 3, 2002

(54) ALL-TERRAIN BICYCLE

(75) Inventor: Antoine Trubiano, Montreal (CA)

(73) Assignee: Carl-All, Inc., Montreal East (CA)

( * ) Notice: Subject to any disclaimer, the term of this patent is extended or adjusted under 35 U.S.C. 154(b) by 0 days.

(21) Appl. No.: 09/785,820

(22) Filed: Feb. 16, 2001

Related U.S. Application Data

(63) Continuation of application No. 09/216,688, filed on Dec. 16, 1998, now abandoned.

(51) Int. Cl.[7] .............................................. B62D 57/00
(52) U.S. Cl. ...................... 280/28.5; 180/9.1; 301/44.4; 301/50; 305/4
(58) Field of Search ................ 180/9, 9.1, 10; 280/28.5; 305/1, 4, 7, 51, 46; 301/45, 50, 44.3, 44.4

(56) References Cited

U.S. PATENT DOCUMENTS

| | | |
|---|---|---|
| 504,265 A | 8/1893 | Bouse |
| 524,349 A | 8/1894 | Putrow |
| 613,940 A | 11/1898 | Ringborg |
| 650,171 A | 5/1900 | Dannehl |
| 658,861 A | 10/1900 | Olson |
| 747,001 A | 12/1903 | Seddon .................. 152/187 |
| 749,830 A | 1/1904 | Work ..................... 152/187 |
| 900,498 A | 10/1908 | Dover .................... 152/187 |
| 1,023,414 A | 4/1912 | Coonrad ................. 152/191 |
| 1,310,746 A * | 7/1919 | Firestone ................. 305/4 |
| 1,336,663 A | 3/1920 | Story .................... 152/191 |
| 1,514,518 A * | 11/1924 | Hanson .................... 305/4 |
| 1,600,589 A | 9/1926 | Hipkins ................... 305/19 |
| 1,605,743 A | 11/1926 | Leniz et al. |
| 1,840,779 A * | 1/1932 | Johnston .................. 305/4 |
| 2,335,372 A * | 11/1943 | Wine ...................... 305/4 |
| 2,466,222 A | 4/1949 | Foner |
| 2,674,971 A * | 4/1954 | Therrien ............... 280/12.14 |
| 3,618,963 A | 11/1971 | Romano |
| 3,814,198 A * | 6/1974 | Seiler ................... 180/183 |
| 3,833,233 A * | 9/1974 | Sugiyama .............. 280/12.4 |
| 3,931,983 A | 1/1976 | Kanouse et al. |
| 4,306,603 A | 12/1981 | Dighe et al. ............ 152/185.1 |
| 4,360,210 A | 11/1982 | Osting |
| 4,759,638 A * | 7/1988 | McLaughlin ................ 305/4 |
| 4,828,280 A | 5/1989 | Kies |
| 5,004,030 A | 4/1991 | McLaughlin ............ 152/185.1 |
| 5,423,559 A | 6/1995 | Rhode |
| 5,482,302 A * | 1/1996 | Yu ..................... 280/12.12 |

* cited by examiner

*Primary Examiner*—Daniel G. DePumpo
(74) *Attorney, Agent, or Firm*—Carter & Schnedler

(57) ABSTRACT

An all-terrain bicycle is comprised of a bicycle frame having a front and a rear fork to which is removably secured a front and a rear wheel. Each wheel has a circular rim which is interconnected to the hub by spokes. The rear wheel has sprockets secured to the central hub and which is interconnected to a driving sprocket by a chain or other such belt-like drive connector. Each of the rims is provided with a surface engaging support shoes assembly to provide support of the bicycle on a surface. Such bicycles are particularly useful for riding on soft and also irregular surfaces which are deformable such as sand, snow or the like.

7 Claims, 5 Drawing Sheets

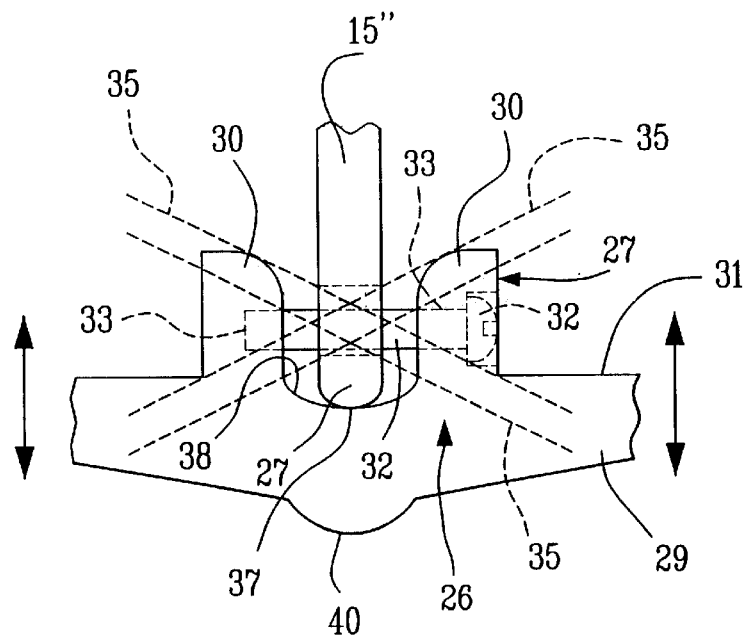
FIG_2A
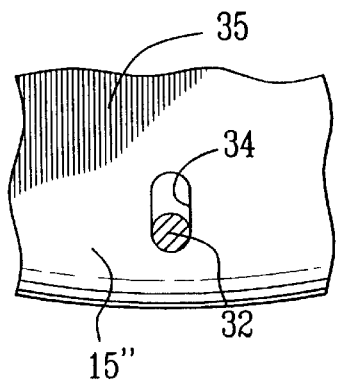
FIG_2B
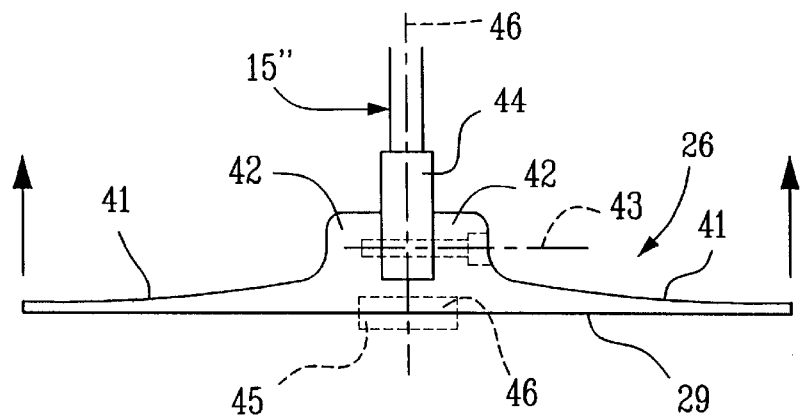
FIG_3

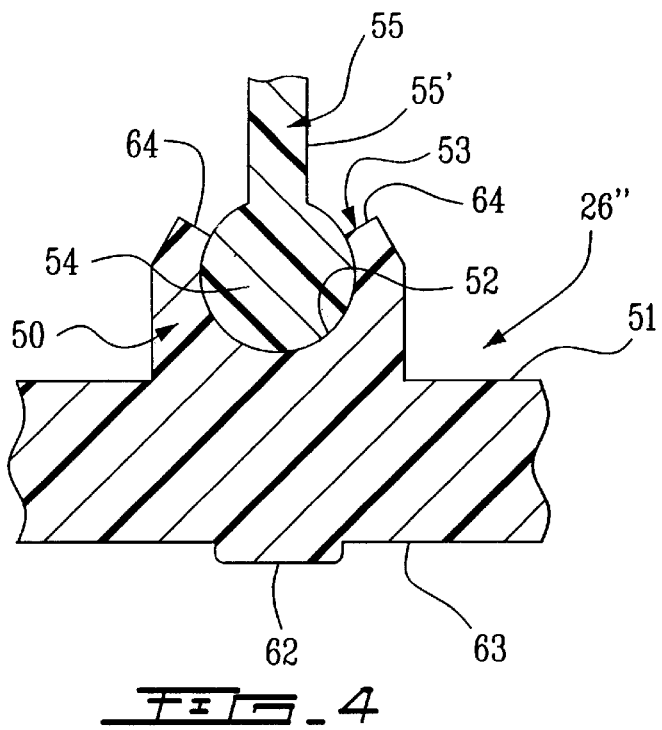
FIG_4
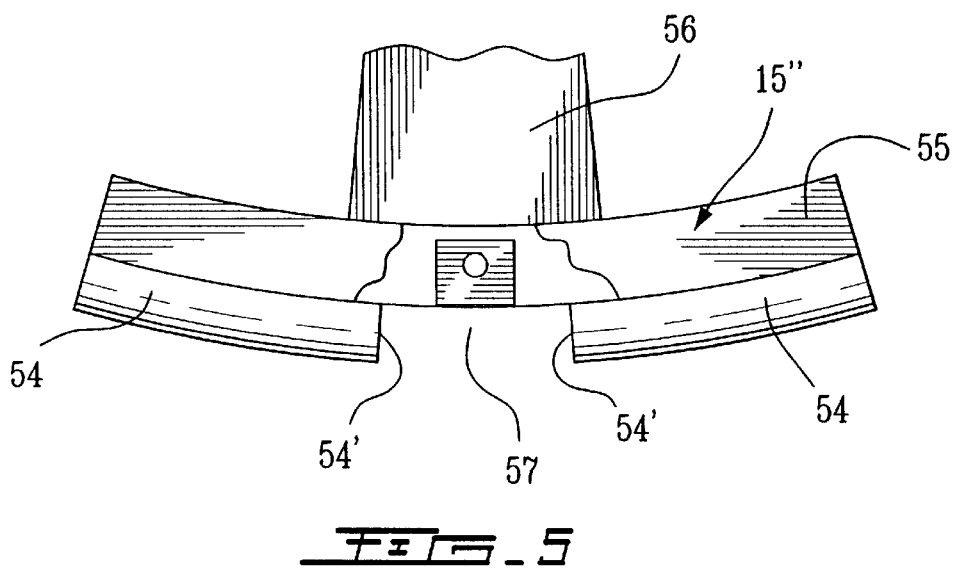
FIG_5
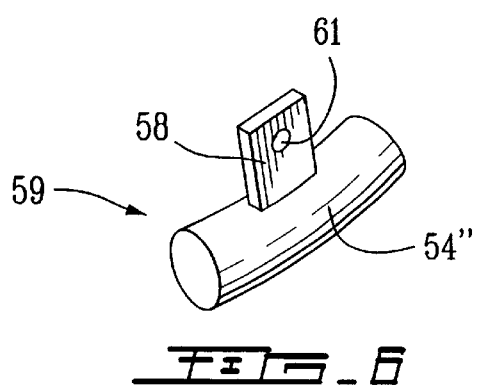
FIG_6

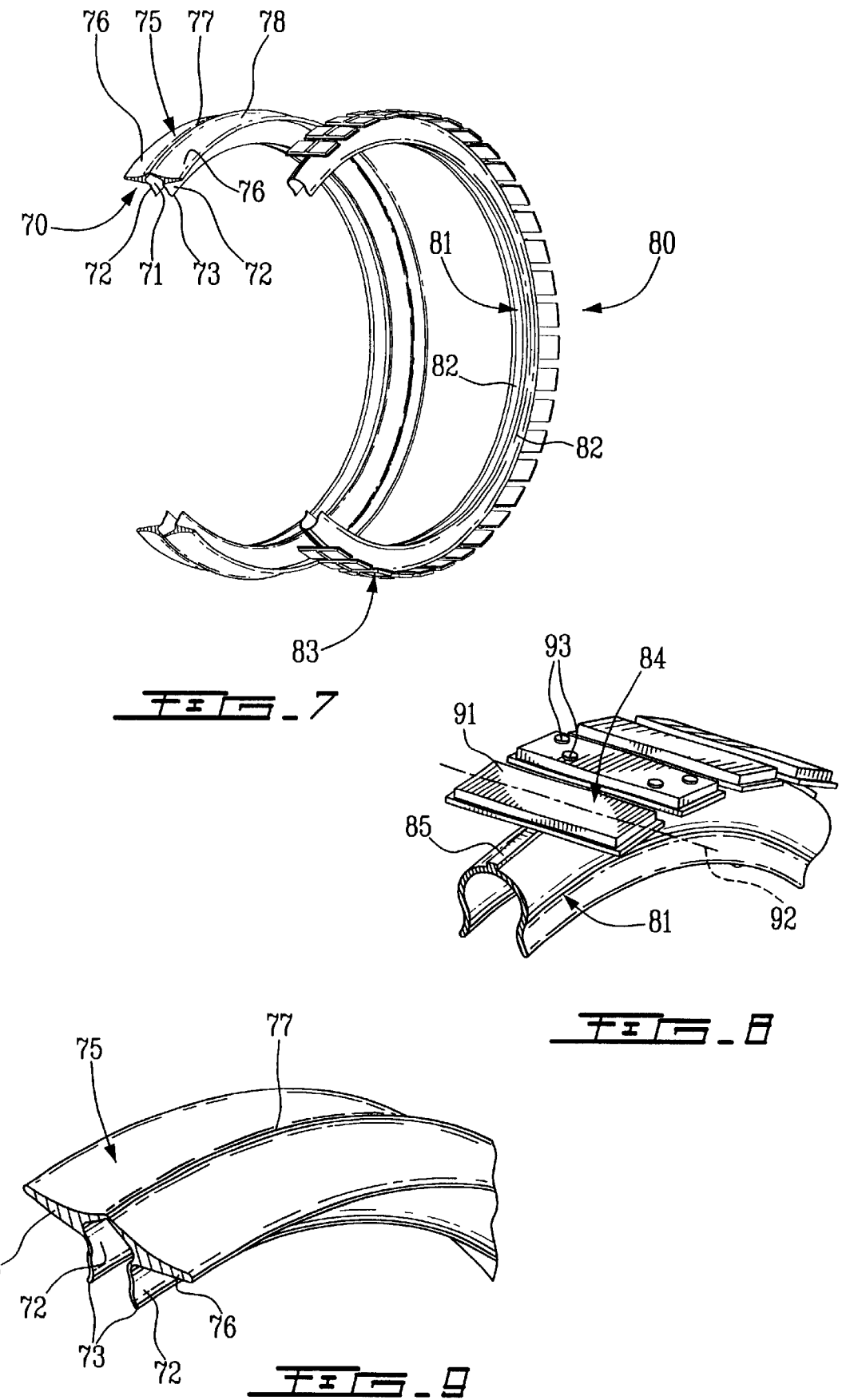

_US 6,443,466 B2_

ALL-TERRAIN BICYCLE

RELATED APPLICATIONS

This is a continuation of U.S. patent application Ser. No. 09/216,688, filed Dec. 16, 1998 now abandoned.

TECHNICAL FIELD

The present invention relates to an all-terrain bicycle having wheels provided with a surface engaging support plate assembly connected to its rim making the bicycle particularly adapted for riding over soft and also irregular surfaces, such as sand, snow, etc.

BACKGROUND ART

All-terrain motorized vehicles are known and are very popular nowadays. Also, the conventional bicycle has been modified and equipped with special shock absorbers and modified tires whereby the rider can drive over irregular terrain and not be subjected to the shocks imparted by such irregular terrain. These are commonly referred to as "mountain bikes". The wheels are still of the conventional construction whereby an inflatable tire is secured about the rims. However, these tires are larger in cross-section than the conventional touring bicycle and are provided with various types of tread formations to provide better surface engagement. These "mountain bikes" are popular for driving along rough trail surfaces such as mountain trails where the bicycle encounters irregular hard packed terrain encumbered with stones, branches, mud and other like obstacles. However, such bicycles are not practical for driving into very soft ground surfaces where there is no hard support for the tires and the tires will sink into the surface and cause the rider to fall.

SUMMARY OF INVENTION

It is a feature of the present invention to provide an all-terrain bicycle which is specifically adapted for riding on soft and also irregular terrain surfaces such as sand, snow or other like soft surfaces.

Another feature of the present invention is to provide a novel bicycle wheel construction particularly adapted for riding on soft and also irregular terrain surfaces.

According to the above features, from a broad aspect, thee present invention provides an all-terrain bicycle which comprises a bicycle frame having a front and a rear fork to which is removably secured a front and a rear wheel. Each of the wheels have a circular rim. Spoke means interconnect a central hub of each of the wheels to the rim. The rear wheel has sprocket means secured to the central hub thereof. Means is provided to impart rotation to the sprocket means. A seat and handlebars are secured to the frame. Each of the rims have a surface engaging support shoes assembly attached thereto to provide support of the bicycle on a surface.

According to a still further broad aspect of the present invention there is provided an all-terrain bicycle as above-described and wherein each of the rims has a tire secured thereto and wherein the tire has a plurality of surface engaging support shoes attached therealong about an outer periphery thereof to provide support of said bicycle on a surface.

According to a still further broad aspect of the present invention there is provided a tire for an all-terrain bicycle. The tire comprises a circumferential generally U-shaped membrane having opposed side walls engageable at a free end thereof in a bicycle rim. The tire has a wide, surface-engaging, outer circumferential wall projecting outwardly from the opposed side walls.

According to a still further broad aspect of the present invention the surface-engaging outer circumferential wall is integrally formed with the tire and defines flexible wing sections projecting outwardly from the opposed walls.

According to a still further broad aspect of the present invention the surface-engaging outer circumferential wall is constituted by a surface-engaging support shoes assembly comprising a plurality of transversely extending support plate members attached about an outer peripheral wall portion of the U-shaped membrane of the tire.

BRIEF DESCRIPTION OF DRAWINGS

A preferred embodiment of the present invention will now be described with reference to the accompanying drawings in which:

FIG. 2A is a fragmented section view showing an embodiment of the pivoting connection of the support plate member to the rim of the bicycle wheel;

FIG. 2B is a side view showing the disposition of the connecting cavity formed in the rim of the wheels;

FIG. 3 is a section-view showing an embodiment of the construction of the support plate member and its connection to the rim of the bicycle wheel;

FIG. 4 is a fragmented section-view showing a still further embodiment of the pivoting connection of the support plate member as well as a further embodiment of the plate members;

FIG. 5 is a fragmented side view showing the construction of the rim and the gap formed therein to permit support plate members to be connected to the rim in sliding fit therewith;

FIG. 6 is a perspective view showing the construction of the insert secured to the rim to close the connecting gap;

FIG. 7 is a perspective view, partly fragmented, showing the construction of two tires formed in accordance with the present invention and each having a different wide, surface-engaging, outer circumferential wall;

FIG. 8 is an enlarged fragmented perspective view showing the construction of the tire having about its outer circumferential wall a surface-engaging support shows assembly;

FIG. 9 is a fragmented perspective view showing the tire of FIG. 7 wherein the wide, surface-engaging, outer circumferential wall is integrally formed with the tire, all along the circumference thereof;

DESCRIPTION OF PREFERRED EMBODIMENTS

Figure 1:
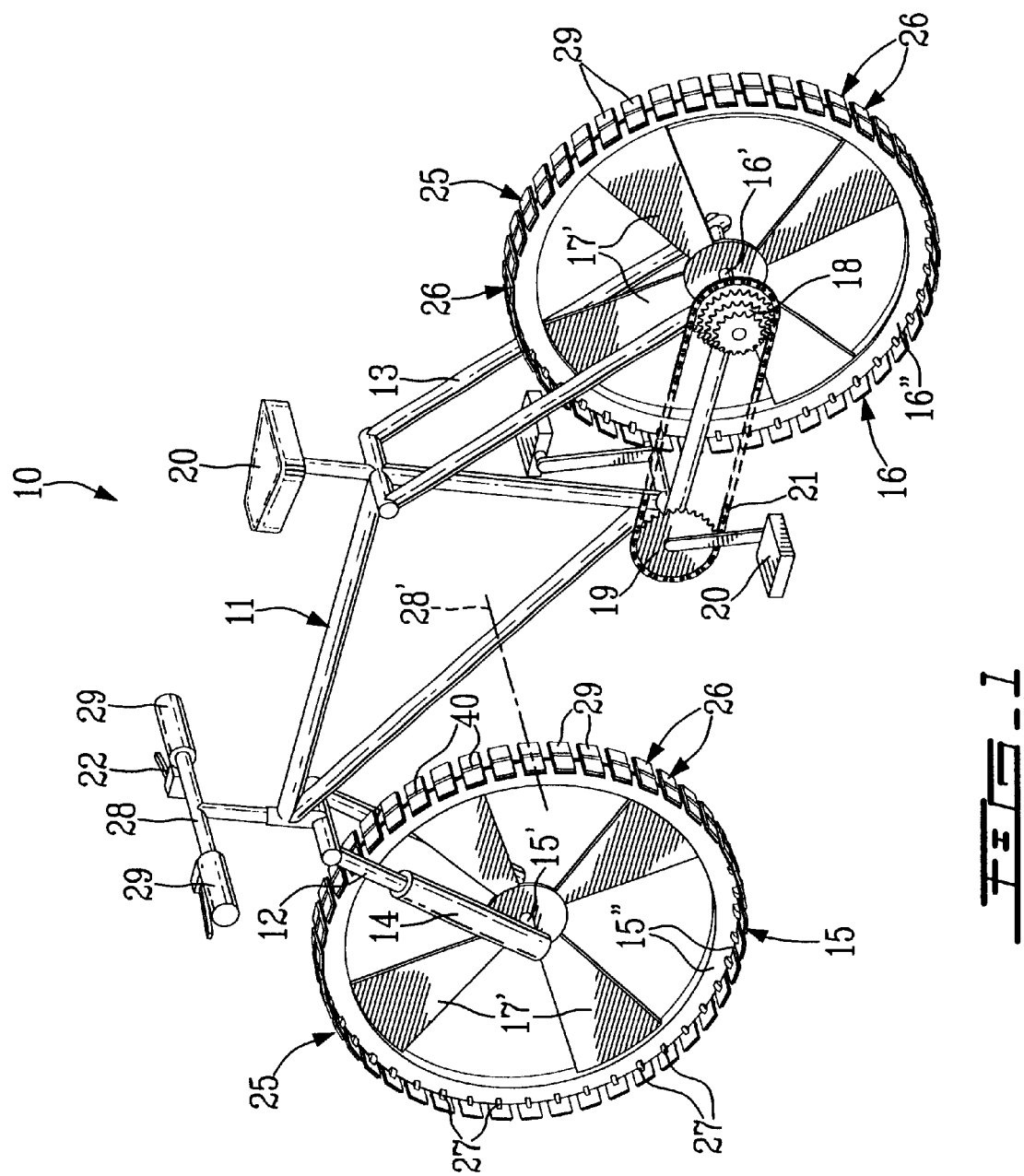
FIG. 1 is a perspective view of an all-terrain bicycle constructed in accordance with the present invention.

Referring now to the drawings, and more particularly to FIG. 1, there is shown generally at 10 an all-terrain bicycle constructed in accordance with the present invention. The bicycle is comprised of a frame 11 having a front fork 12 and a rear fork 13. Shock absorbers 14 are secured to the front fork 12 as is well known in the art. A front wheel 15 and a rear wheel 16 are respectively connected to the front fork 12 and the rear fork 13. The front and rear wheels are provided with a central hub 15' and 16' respectively which are interconnected to the rims 15" and 16" by spokes 17' and 17", respectively.

The rear wheel 16 is provided with a sprocket set 18 connected to its hub 16' and driven by a drive sprocket 19 secured to the frame 11 beneath the seat 20, as is well known in the art. Foot engaging peddles 20 rotate the drive sprocket 19 and through its chain link connection 21, or other such belt-like drive connector, drives the sprocket set 18 to impart movement to the bicycle 10. Brakes are also provided on the front and/or rear wheels and actuated by brake hand levers 22, as is well known in the art. Thus far, a conventional bicycle has been described.

The present invention relates to the construction of the wheels 15 and 16. As hereinshown these wheels are provided with a surface engaging support shoes assembly 25 secured respectively to the rims 15" and 16" of the wheels 15 and 16. This support shoes assembly provides support of the bicycle 10 on any type of surface, being a hard surface, such as a hard, flat surface, but particularly conceived for soft and also irregular surfaces, such as sand, snow, mud, etc.

As shown in FIGS. 1, 2A and 2B, the surface engaging support shoes assembly is comprised of a plurality of support plate members 26 which are attached about an outer periphery 27 of each of the rims 15" and 16". These support plate members 26 are connected to the outer periphery by a pivoting connection such as the one illustrated and designated by reference numeral 27 in FIG. 2A, whereby each of the support plate members 26 can pivot independently along an axis 28' (see FIG. 1) which is transverse to the plane of the rim. The pivoting connection 27 permits each of the support plate members 26 to be removably connected to the rim in a side-by-side relationship throughout the outer periphery of the rims. These support plate members can be disposed in very close side-by-side relationship or slightly spaced part as is desirable. Ideally, the support plate members 26 are from approximately one to two inches wide and from two to seven inches long and spaced apart about one quarter inch.

As shown in FIG. 1, the support plate members are provided with a flat, outer rectangular surface 29 and have a V-like shaped longitudinal cross-section as is more apparent from the support plate member 26', see FIG. 3, and with the partial cross-section as shown in FIG. 2A. The axis 28 which is transverse to the plane of the rim is the longitudinal central axis of the rectangular surface 29.

As shown in FIG. 2A, the pivoting connection 27 is constituted by a pair of spaced-apart attachment flanges 30 projecting from a rear wall 31 of each of the support plate members 26. A removable fastener 32 is connected between cavities 33 provided in the attachment flanges 30 and this fastener member extends through a longitudinal connecting cavity 34 as shown in FIG. 2B and disposed in the side wall 35 of the rim 15" and 16". The removable fastener 32 extends within this longitudinal cavity in close fit therein but can articulate therein to positions as shown by phantom lines 35, in FIG. 2A, to permit the said independent pivoting of the support plate members along the axis 28 which is transverse to the plane of the wheel. Accordingly, as the bicycle is displaced over an irregular surface, the support plates will pivot independently when moving over an irregular surface while at the same time providing a large support surface area on the soft surface.

It is pointed out that in use, the rider operating the bicycle 10 has his hands positioned on the handles 29 of the handlebar 28 and balances the bicycle on the rim 15" and 16". Accordingly, the outer end 37 of the rims receives the load on the bicycle and permits the user to balance himself on the bicycle regardless of the irregularities and softness of the support surface. Therefore, the bicycle will move along while the plates articulate on their axis 28. To facilitate this articulation, the outer end 37 of the rim is rounded and moves within a dome-shaped cavity 38 provided on the rear wall 31 between the attachment flanges 30 to provide smooth articulation of the support plate members 26.

As shown in FIG. 2A, a projecting rib 40 may be formed at substantially mid-length of the flat outer rectangular surface 29 and aligned with the curved transverse cavity 38. The purpose of this projecting rib is to provide support for the wheel when the bicycle is driven on a hard surface, such as an asphalt or cement surface. This may simulate the width of a standard rubber tire and provide less friction on that surface for ease of displacement of the bicycle. A few of these projecting ribs 40 are illustrated on some of the support plate members 26 as shown in FIG. 1. It is also pointed out that these support plate members 26 are molded as a unitary part from plastics material with the projecting rib 40 formed integral therewith.

Referring now to FIG. 3, there is shown a still further embodiment of the construction of the support plate members 26. As hereinshown, the support plate members 26' are molded from plastics material and define tapering flat outer rectangular flexible shoulder portions 41 capable of flexing when the bicycle is driven on an irregular surface. These shoulder portions would flex upwardly if the support plate member is driven over an irregular surface.

The connection of the support plate member 26' to the frame can be effected through a pair of attachment flanges 42 and a fastener 43 connected directly to a reinforced outer rim portion 44 wherein there is no articulation between the rim and the connection. The only articulation would be in the flexing of the outer end portions of plate shoulders 41. However, if desirable a pivoting connection such as described in FIG. 2A may also be provided. Although the outer rectangular surface 29 is hereinshown as a flat surface, an insert 45 of rubber-like material could be molded in a cavity 46 provided in the surface 29 and extending transversely along the plane 47 of the wheel 15" and 16". This rubber insert would provide better simulation of a bicycle tire when the bicycle is used on a hard surface, as above-described.

The support plate members 26 may also be provided of different sizes and configuration to suit the use of the bicycle as these support plate members are removably securable to the rim. However, the configuration of such would be limited by the spacing of the fork members 12 and 13. Although not shown herein, these fork members could also be modified to adapt to support plate members of difference sizes. Although not shown, these fork members may have an outer curvature in the area where the support plate members pass to form a large opening capable of accepting plate members of different sizes. This would be particularly useful if large plates are secured to the rim to facilitate the use of the bicycle on snow where the support surface is very soft and requires support plate members having larger support surfaces.

Referring now to FIGS. 4 to 6, there will be described a further embodiment of the pivoting connection. As hereinshown, the support plate member 26" is molded from plastics material as a unitary member and provided with an upstanding rib 50 formed in the rear wall 51 thereof. A curved channel 52 of arcuate cross-section is formed in the top wall 53 of the upstanding rib 50 and adapted to receive captive therein and in sliding frictional fit, a portion of an outer peripheral annular section 54 of the rim 15" and 16".

The rim 15" is provided with a side wall 55 above the annular section 54. The side wall 55 is connected to the central hub by spoke means, as hereinshown large flange-like spokes 56 to provide a rigid rim. As shown in FIG. 5, the annular section 54 is provided with a gap 57 whereby to provide a means to connect the support plate members 26" to the annular section 54. Accordingly, the upstanding rib 50 is disposed with its curved channel 52 in alignment with the open ends 54' of the annular section 54 aligned with the ends of the curve channel and it is slid thereover in frictional sliding fit to assume its position as shown in FIG. 4. Once the support plate members 26 have been inserted all along the outer periphery of the rim a last support plate member is slid onto the annular section 54" of an insert 59, as shown in FIG. 6, and connected to the upstanding side wall 55 of the rim by means of an attachment flange 58 secured to the annular section 54". The connecting flange 58 fits within a connecting groove 60 formed in the upstanding side wall. A fastener (not shown) extends through the threaded hole 61 provided in the connecting flange 58 and in the upstanding side wall 55 of the rim within the connecting channel 60.

As shown in FIG. 4 an upstanding projecting rib 62 may also be molded integral with the support plate member 26" and disposed mid-length of the support plate member in the outer rectangular surface 63 thereof and aligned with the upstanding rib 50. As also shown in FIG. 4, the upstanding rib 50 is provided with an angled abutment wall 64 provided on opposed sides of the curve channel and spaced from the outer surfaces 55' of the upstanding side wall 55 of the rim whereby to permit the support member 26" to pivot along the transverse axis 28 along a limited arc defined by the spacing between the outer surfaces 55 of the upstanding side wall and the surfaces 64. To replace a damaged support plate member, it is slid along the rim to the insert 59 which is then removed and reinstalled with a new support plate member.

Figure 10:
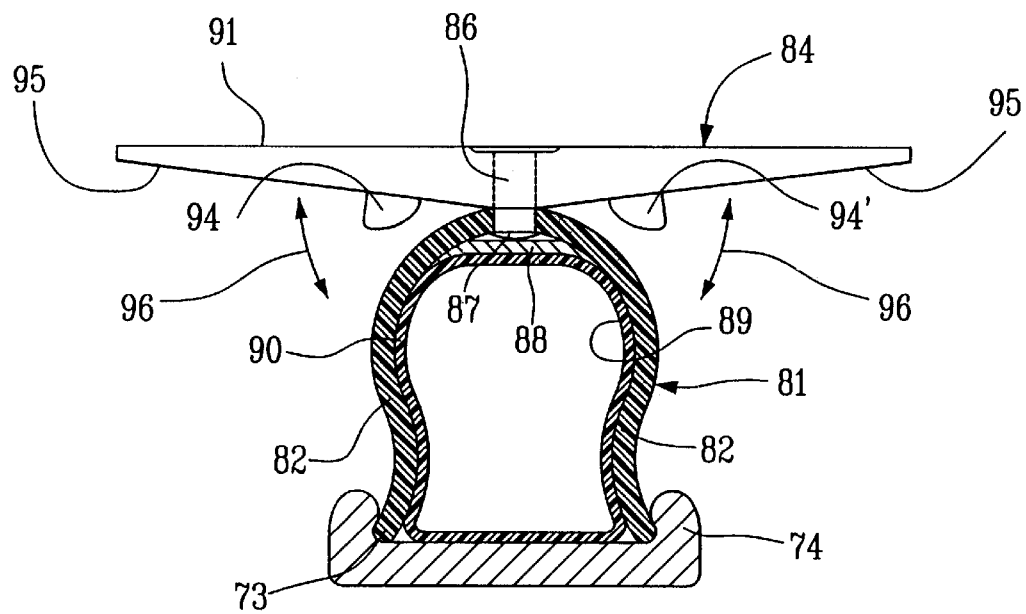
FIG. 10 is a cross-section view illustrating how a support plate member of the support shows assembly is secured to the U-shaped membrane of the tire.
Figure 11:
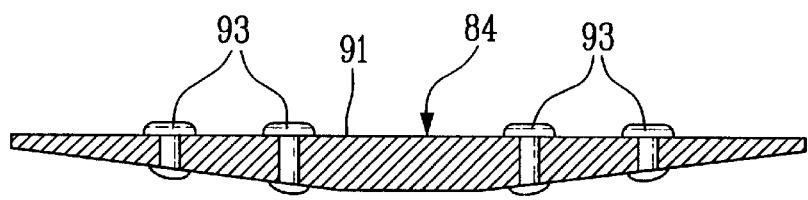
FIG. 11 is a side view showing a support plate member having metal studs secured therein.

Referring now to FIGS. 7 and 9, there is illustrated the construction of tires which are adapted to fit about the standard rim of bicycles, which rims are well known in the art. One of the tires, namely tire 70, is comprised of a circumferential, generally U-shaped membrane 71 having opposed side walls 72 and which are engageable at a free end 73 in a bicycle rim 74 as illustrated in FIG. 10. The tire 70 has a wide, surface-engaging outer circumferential wall 75 which projects outwardly from opposed side wall 72 thereof to constitute flexible wing sections 76. The outer circumferential wall 75 is integrally formed with the tire and is provided with a projecting rib 77 disposed at mid-length of the outer surface 78 of the circumferential wall and extends about the entire circumference of the wall.

Referring now to FIGS. 7 and 8, there will be described the construction of the tire 80 which is also comprised of a U-shaped membrane 81 having opposed side walls 82 but wherein the wide, surface-engaging, outer circumferential wall is constituted by a surface engaging support shoes assembly 83. The surface engaging shoes assembly, as better seen in FIG. 8, is comprised of a plurality of transversely extending rectangular support plate members 84 attached about the outer peripheral wall portion 85 of the U-shaped membrane 81. These support plate members 84 may also be molded with the U-shaped membrane 81. On the other hand, they could be removably secured to the U-shaped membrane by attachment means, as shown in FIG. 10.

As shown in FIG. 10, the attachment means is constituted by a rivet 86 having a head 87 positioned internally of the U-shaped membrane 81 whereby to secure the rectangular support plate member 84 thereto. After a plurality of plates 84 have been secured about the outer circumference of the U-shaped membrane 81 a protective tape 88 is placed on the inside surface 89 of the U-shaped membrane, all along its inner circumference whereby to protect the heads 87. A standard tube 90 is then positioned within the tire to inflate the tire on the rim 74 of the all-terrain bicycle.

Referring again to FIG. 8, it can be seen that the support plate members have a flat, outer rectangular surface 91 having its central longitudinal axis 92 extending transverse to the longitudinal axis of the U-shaped membrane 81. These support plate members 84 may also have metal studs 93 secured in the outer flat surfaces 91 thereof to provide gripping on ice covered surfaces, if desired. It is pointed out that a plurality of different types of tires may be provided to accommodate the all-terrain bicycle on various terrain. For example, the tire 70, as shown in FIG. 7, would be convenient for use on soft sand or snow surfaces. Similarly, the tire 80 as shown in FIG. 7 could be for that purpose. A modified tire 80 may also be provided in which these studs 93 are disposed on the support plate members for operating the all-terrain vehicle on icy surfaces.

As shown in FIG. 10, the support plate members 84 may also be provided with a rear projecting members 94 and 94' on a rear face 95 of the support plate members. These projecting members are spaced a predetermined distance from the opposed side walls 82 of the U-shaped membrane 81 to limit pivotal displacement of the support plate members on their transverse axis 92. As the support plate members pivot in the direction as indicated by arrow 96, these projecting members 94 and 94' will abut with the outer surface of the side walls 82 thereby providing shock absorbency and limiting the pivotal displacement. The shock absorbency is provided by the inflated tire against which the projecting members abut thereby cushioning the pivoting plate member and providing for a smooth ride of the all-terrain bicycle.

Figure 12:
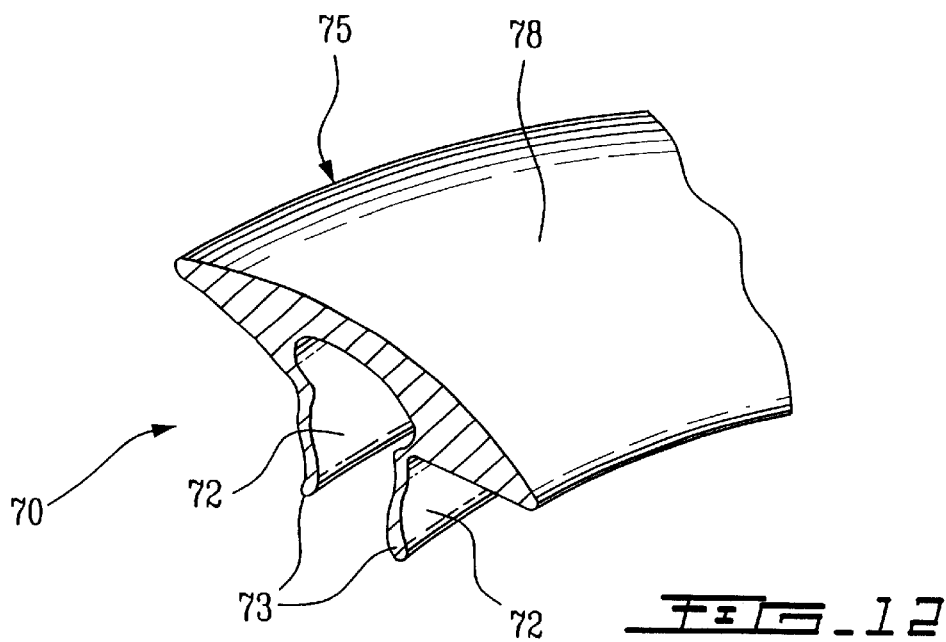
FIG. 12 is a fragmented perspective view, similar to FIG. 9, but illustrating a modified outer surface of the outer circumferential wall.

FIG. 12 shows a further modification of the tires 70 as shown in FIG. 7. As hereinshown, the outer surface 78 of the outer circumferential wall 75 is a smooth, flat surface. As previously described, the purpose of the rib 77, as shown in FIGS. 7 and 9, is to provide less friction when the all-terrain vehicle is used on a hard surface such as a concrete or asphalt road.

It is pointed out that it is within the ambit of the present invention to cover any obvious modifications of the construction of the support plate members and its pivotal connection as well as the rims of the wheels, provided such modifications fall within the scope of the appended claims. For example only, it is conceivable that the entire support shoes assembly be mounted or molded on a rim engaging band which is then secured in a channel formed about the outer periphery of the rim.

What is claimed is:

1. An all-terrain bicycle comprising a bicycle frame having a front and a rear fork to which is removably secured a front and a rear wheel, each said wheel having a circular rim, spoke means interconnecting a central hub of each of said wheel to said rim, said rear wheel having a chain sprocket secured to said central hub, means to impart rotation to said chain sprocket, a seat and handlebars secured to said frame, each said rim having a surface engaging support shoes assembly attached thereto to provide support of said bicycle on a surface, said surface engaging support shoes assembly comprised of a plurality of support plate members attached about an outer periphery of each said rim, said support plate members being connected to said outer periphery by a pivoting connection whereby each said support plate member can pivot independently along an axis transverse to the plane of said rim, said pivoting connection being constituted by a pair of spaced-apart attachment flanges projecting from a rear wall of each said support plate members, a removable fastener connectable between said attachment flanges and adapted to extend through a connecting cavity formed in a circumferential side wall of said rim, said connecting cavity being dimensioned to permit said fastener to articulate within said connecting cavity to permit said support member to pivot along said axis transverse to the plane of said rim, said rim has an outer peripheral wall which is of dome-shape cross-section to receive thereon in frictional contact a curved transverse cavity formed in said rear wall of said support plate member, said outer peripheral wall transferring a load on said bicycle onto said concave curved transverse cavity.

2. An all-terrain bicycle as claimed in claim 1 wherein said support plate members are removably connectable to said rim through said pivoting connection.

3. An all-terrain bicycle as claimed in claim 1 wherein said support plate members are disposed in side-by-side relationship throughout said outer periphery of each said rim.

4. An all-terrain bicycle as claimed in claim 1 wherein each said support plate members have a flat outer rectangular surface, and a V-shape longitudinal cross-outer rectangular surface, and a V-shape longitudinal cross-section, said axis transverse to the plane of said rim being a longitudinal central axis of said rectangular surface.

5. An all-terrain bicycle as claimed in claim 1 wherein each said support plate members have a flat outer rectangular surface, a projecting rib disposed at mid-length of said flat outer rectangular surface and extending transverse to a longitudinal axis of said rectangular surface.

6. An all-terrain bicycle as claimed in claim 5 wherein said projecting rib is formed integrally with said support plate members which are molded from plastics material.

7. An all-terrain bicycle as claimed in claim 1 wherein a projecting rib is disposed at mid-length of said flat outer rectangular surface and aligned with said curved transverse cavity.

* * * * *